(12) United States Patent
Seo

(10) Patent No.: US 7,499,993 B2
(45) Date of Patent: Mar. 3, 2009

(54) MEDIA CONTENTS MONITORING APPARATUS AND METHOD THEREOF

(75) Inventor: Sang-Il Seo, Gwangju (KR)

(73) Assignee: LG Electronics Inc., Seoul (KR)

( * ) Notice: Subject to any disclaimer, the term of this patent is extended or adjusted under 35 U.S.C. 154(b) by 690 days.

(21) Appl. No.: 10/288,332

(22) Filed: Nov. 6, 2002

(65) Prior Publication Data

US 2003/0088670 A1 May 8, 2003

(30) Foreign Application Priority Data

Nov. 6, 2001 (KR) .................. 10-2001-0068875

(51) Int. Cl.
*G06F 15/173* (2006.01)

(52) U.S. Cl. ................................ 709/224

(58) Field of Classification Search ........... 709/201, 709/225, 224, 213
See application file for complete search history.

(56) References Cited

U.S. PATENT DOCUMENTS

| | | | | |
|---|---|---|---|---|
| 6,037,981 A * | 3/2000 | Wilson et al. | ......... | 375/240.12 |
| 6,438,136 B1 * | 8/2002 | Bahl | ........................ | 370/458 |
| 6,438,579 B1 * | 8/2002 | Hosken | ....................... | 709/203 |
| 6,452,943 B1 * | 9/2002 | Furuya | ........................ | 370/468 |
| 6,564,380 B1 * | 5/2003 | Murphy | ....................... | 725/86 |
| 6,564,383 B1 * | 5/2003 | Combs et al. | ............... | 725/136 |
| 6,711,622 B1 * | 3/2004 | Fuller et al. | ................. | 709/231 |
| 2005/0039214 A1 * | 2/2005 | Lorenz et al. | ............... | 725/105 |
| 2005/0246752 A1 * | 11/2005 | Liwerant et al. | ............ | 725/109 |

\* cited by examiner

*Primary Examiner*—Jason D Cardone
*Assistant Examiner*—Minh-Chau Nguyen
(74) *Attorney, Agent, or Firm*—Birch, Stewart, Kolasch & Birch, LLP

(57) ABSTRACT

The present invention relates a media contents monitoring apparatus and a method thereof capable of monitoring media contents information displayed through a certain display apparatus even in a remote place, the media contents monitoring apparatus extracts a media contents sample displayed on the object of monitoring according to set extraction setting information by a monitor's request, converts the extracted media contents sample into a file format appropriate to a web protocol and transmits it to a monitoring unit in a remote place through the Internet. And, accordingly the monitoring unit in the remote place can check the media contents displayed through the object of monitoring by using the media contents sample received through the Internet.

17 Claims, 4 Drawing Sheets

MEDIA CONTENTS MONITORING APPARATUS AND METHOD THEREOF

BACKGROUND OF THE INVENTION

1. Field of the Invention

The present invention relates to a media contents monitoring apparatus and a method thereof, and in particular to a media contents monitoring apparatus and a method thereof capable of monitoring media contents information displayed through a certain display in a remote place.

2. Description of the Prior Art

In general, a digital broadcast is divided into a digital satellite broadcast, a ground wave digital broadcast and a cable digital broadcast.

Those digital broadcasts respectively use different transmission mediums such as a satellite, a ground wave and a cable, etc. However, a video/audio data compression method and a transmission stream format of a digital broadcast signal are the same mostly.

At present, a transmission stream format basically used in the digital broadcast is defined in ISC/IEC 13818-1 standard.

In the transmission stream format standard, video and audio signals are transmitted as a 188 byte packet format having a MPEG2 transmission stream structure, and each packet consists of 4 byte header having information about packet format and 184 byte payload.

In addition, information about a transmission network state, a kind of program, etc. can be transmitted by being added to the video or audio signal, such information is transmitted to a reception side as a data format having a table form.

FIG. 1 is a block diagram illustrating the conventional digital television receiver, and FIG. 2 illustrates a transmission stream format structure of a broadcast signal.

As depicted in FIG. 1, a channel unit 100 of the digital television receiver performs synchronization and demodulation about a transmission stream of a broadcast signal received according to control of a microcomputer 110, converts the synchronized and demodulated broadcast signal into a digital signal, corrects an error occurred in the transmission process and outputs it to a demultiplexer 120.

The demultiplexer 120 divides the broadcast signal received from the channel unit 100 into a video signal and an audio signal and outputs them to an A/V decoder 130.

Herein, as depicted in FIG. 2, the transmission stream format of the broadcast signal transmitted to the channel unit 100 is an 188 byte packet format having a header 200 and a payload 210.

Herein, the header 200 includes a synchronous signal 212, a transmission error indication 214, a unit start indication 216, a transmission priority 218, a PID (packet identifier) 220 designating a MPEG-2 packet and cyclic counter information 222.

In addition, the PID 220 includes film rating information (informing audiences age guideline) of a program such as a movie.

For example, when a program is G (general audiences) rated, film rating information bit is displayed as 0, when a program is NC-17 (no one 17 and under admitted) rated, film rating information bit is displayed as 1.

In the meantime, when the film rating information of the PID is constructed as 2 bit, detailed film rating such as a NC-15 (no one 15 and under admitted) and a R (restricted) can be informed.

The microcomputer 110 judges whether the program is G rated or NC-17 rated by the film rating information of the PID of the transmission stream format of the broadcast signal outputted from the channel unit 100.

Then, the microcomputer 110 loads information for displaying the G rated or the NC-17 rated from a memory 140 according to the judging result, decodes the loaded information through an A/V decoder 130 and outputs it to a display unit 150.

The display unit 150 displays the film rating of the program such as the G or the NC-17 by receiving the information from the A/V decoder 130.

Accordingly, a guardian watching the digital television (the display unit 150) can check whether the pertinent media contents is the G rated or the NC-17 rated through the displayed film rating and can protect minors from noxious media contents.

However, contrary to a provider's expectations who provides film rating information about media contents, film rating information may stimulate curiosity of minors.

In more detail, when the guardian leaves a house because of a travel or a meeting or a business, etc. and minors watch media contents, film rating information may be misused as information stimulating curiosity of the minors.

As described above, the film rating information indicating the G or the NC-17 can perform its original function properly only when the guardian watches a pertinent media together with the minors.

Accordingly, although the minors watch noxious media contents by using a display apparatus such as a digital television receiver or a video cassette recorder or a DVD player without the knowledge of the guardian, the guardian can not check that.

SUMMARY OF THE INVENTION

In order to solve the above-mentioned and other problems, it is an object of the present invention to provide a media contents monitoring apparatus and a method thereof capable of transmitting displayed media contents information to a monitoring unit in a remote place.

In order to achieve the above-mentioned and other objects, a media contents monitoring apparatus in accordance with an aspect of the present invention includes an extraction information inputting unit for receiving extraction setting information for extracting a media contents sample from a monitor; a microcomputer for controlling each unit according to the extraction setting information inputted by the monitor; an extraction cycle setting unit for setting a reference cycle and time for extracting a media contents sample according to the extraction setting information received through the extraction information inputting unit; a media contents sample extracting unit for extracting a media contents sample displayed on a screen of the object of monitoring according to the reference cycle and time set by the extraction cycle setting unit; a sample data converting unit for converting the extracted media contents sample into a data format appropriate to a web protocol; and a media contents sample providing unit for providing the data-converted media contents sample to the monitoring unit according to the extraction setting information through the network.

A media contents monitoring method in accordance with another aspect of the present invention includes receiving media contents extraction setting information (which includes a sample extraction key signal, a sample extraction cycle and time, data conversion information of an extracted media contents sample, providing cycle and time information of the data-converted media contents sample) from a monitor who monitors media contents displayed on the object of monitoring; monitoring whether media contents are displayed through the object of monitoring; extracting a displayed media contents sample according to the extraction cycle and time when the media contents are displayed through the object of monitoring; data-converting the extracted media contents sample into a data format to be transmitted through a network; and transmitting the data-converted media contents sample to a monitoring unit according to the providing cycle and time information of the media contents sample through the network.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the preferred embodiments of the present invention will be described with reference to accompanying drawings.

Figure 1:
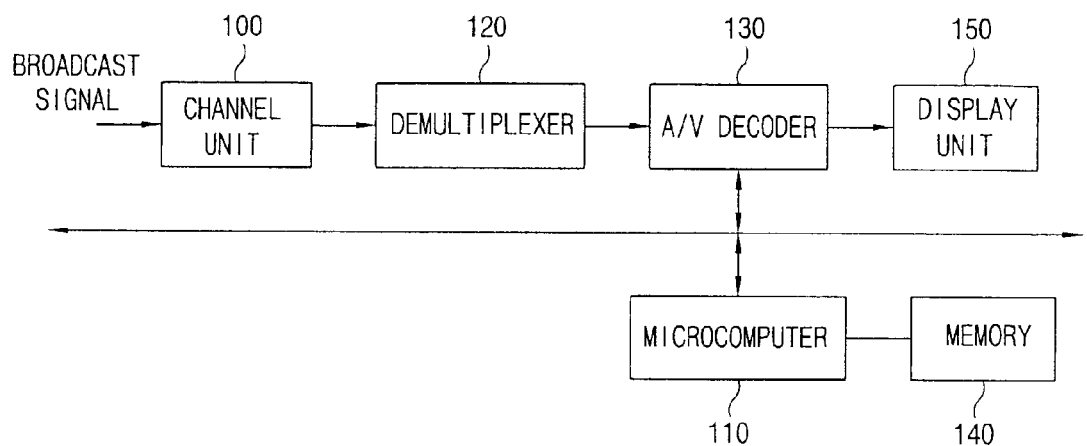
FIG. 1 is a block diagram illustrating the conventional digital television receiver.
Figure 2:
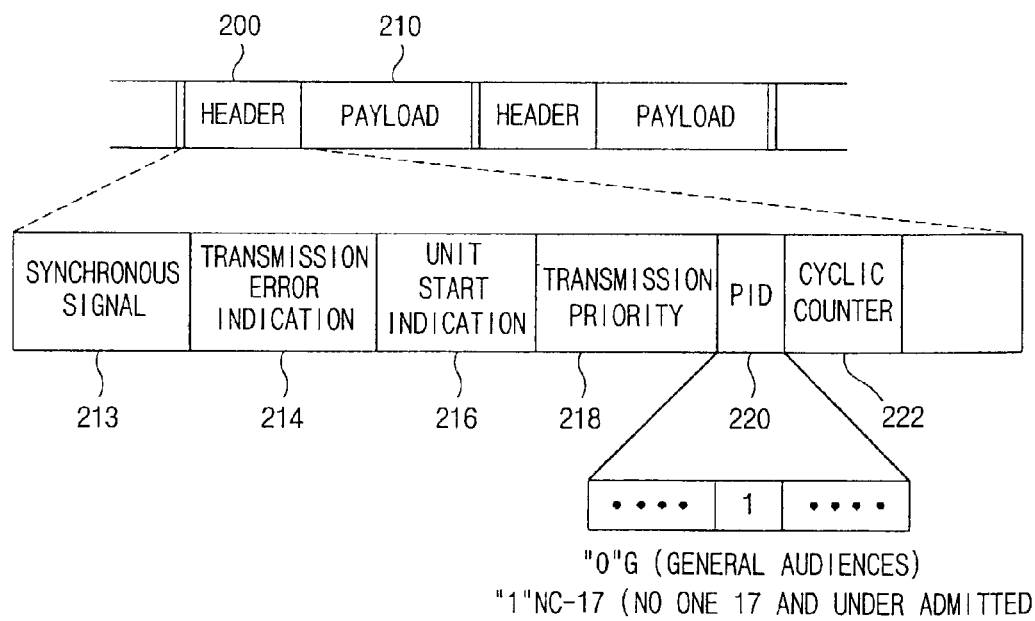
FIG. 2 illustrates a transmission stream format structure of a broadcast signal.
Figure 3:
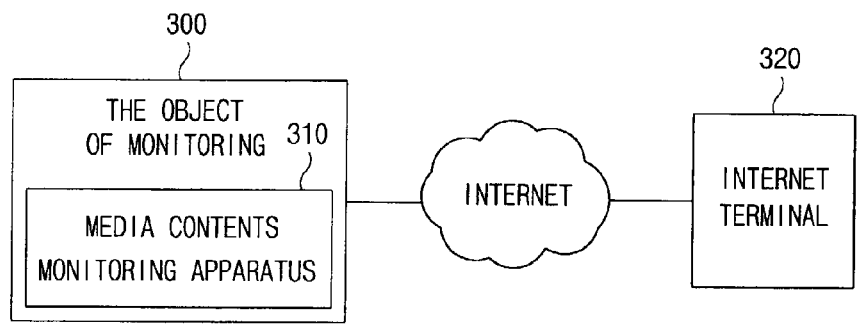
FIG. 3 is a schematic block diagram illustrating a media contents monitoring system in accordance with the present invention.
Figure 4:
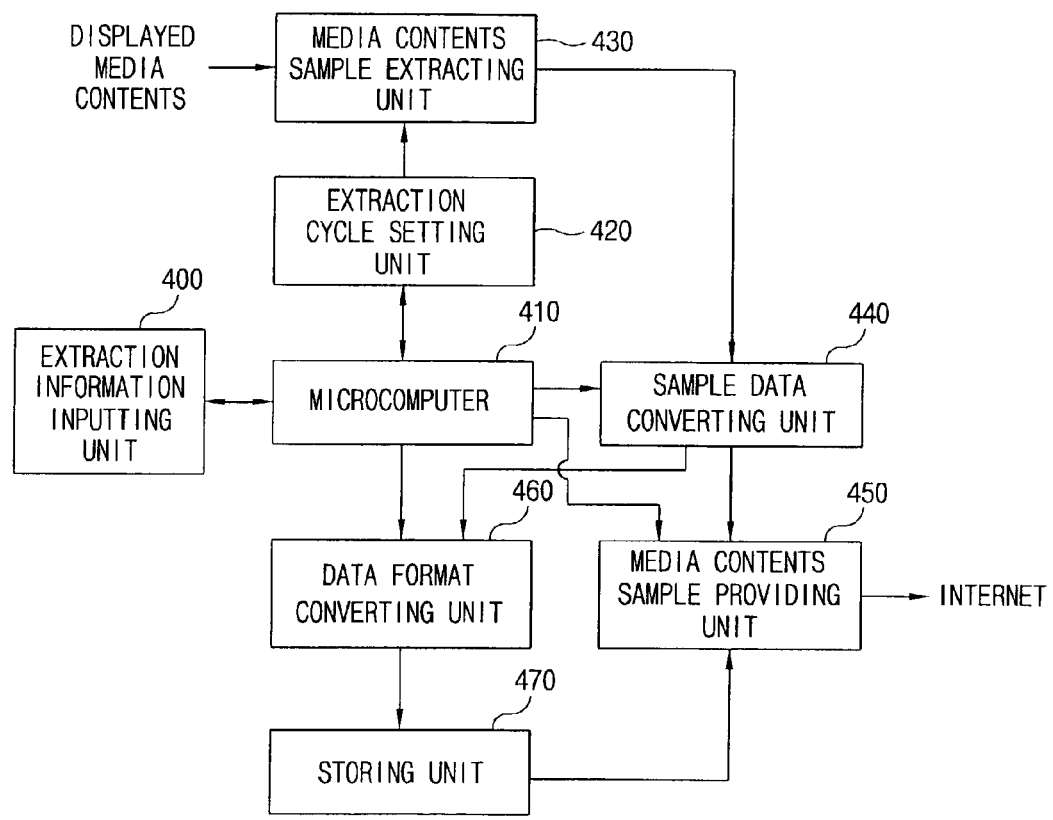
FIG. 4 is a block diagram illustrating a media contents monitoring apparatus in accordance with the present invention.

FIG. 3 is a schematic block view illustrating a media contents monitoring system in accordance with the present invention, and FIG. 4 is a block diagram illustrating a media contents monitoring apparatus in accordance with the present invention.

As depicted in FIG. 3, the media contents monitoring system in accordance with the present invention includes a media contents monitoring apparatus 310 for extracting a media contents sample from media contents displayed through the object of monitoring 300 such as a digital television receiver according to a preset cycle and transmitting it through the Internet; and an Internet terminal 320 connected to the Internet, monitoring media contents displayed through the object of monitoring 300 according to the received media content sample from the media content apparatus 310 in a remote place.

As depicted in FIG. 4, the media content monitoring apparatus 310 includes an extraction information inputting unit 400 for receiving extraction setting information for extracting a media contents sample by a user; a microcomputer 410 for controlling each unit according to the extraction setting information inputted by the user; an extraction cycle setting unit for setting an extraction cycle and time of the media contents sample as reference data according to the extraction setting information; a media contents sample extracting unit 430 for extracting a media contents sample displayed on a screen of the object of monitoring 300 according to the extraction cycle and time set as the reference data by the extraction cycle setting unit 420; a sample data converting unit 440 for converting the extracted media contents sample into a data format appropriate to a web protocol; a media contents sample providing unit 450 for providing the media contents sample data-converted by the sample data converting unit 440 to the Internet terminal 320; a data format converting unit 460 for converting the data-converted media contents sample into a data format structure in order to store it as a history arrangement structure; and a storing unit 470 for storing the converted media contents sample.

Herein, the media contents sample providing unit 440 includes a web server program or a file server program for transmitting the media contents sample to the Internet terminal 320 connected to the Internet.

In the present invention, the media contents monitoring apparatus 310 can be built in the object of monitoring 300 or be constructed as an outer packaging.

The operation of the media contents monitoring system in accordance with the present invention will be described.

Herein, the object of monitoring 300 is a digital television receiver, a target of monitoring is a minor, the Internet terminal 320 is a computer connected to the Internet, and a guardian is a monitor.

First, in order to monitor whether the minor watches NC-17 rated media contents through the digital television receiver, the guardian sets conditions for extracting a media contents sample.

In more detail, the guardian inputs an extraction key signal for extracting a media contents sample, media content sample extraction cycle and time, a data conversion structure, and the extracted media contents sample providing cycle and time (i.e., transmission cycle and time for providing the extracted media contents sample to the terminal 320), through the extraction information inputting unit 400 of the media contents monitoring apparatus 310.

Herein, the extraction information inputting unit 400 is an input key constructed as one body with a remote controller for inputting extraction setting information wirelessly in a remote place or the object of monitoring 300.

In addition, the extraction setting information includes a sample extraction key signal, sample extraction cycle and time, data conversion information of the extracted media contents sample, the data-converted media contents sample providing cycle and time.

Herein, in order to prevent the minor or other illegal user from inputting sample extraction setting information without permission, a password for extraction setting information input is set.

In more detail, when an extraction setting information input is requested by the user through the extraction information input unit 400, the microcomputer 410 outputs a password input request signal for confirming user identification, checks a password received through the user and confirms the user identification.

Then, the microcomputer 410 controls the extraction cycle setting unit 420, the sample data converting unit 440, the media contents sample providing unit 450 and the data format converting unit 460 according to the extraction setting information inputted by the extraction information inputting unit 400.

The extraction cycle setting unit 420, the sample data converting unit 440, the media contents sample providing unit 450 respectively set media content sample extraction cycle and time, a data conversion structure, the extracted media contents sample providing cycle and time as reference data by the control of the microcomputer 410.

As described above, in the media contents sample extraction condition set state, when the minor operates the object of monitoring 300 (digital television receiver) and selects a certain channel, the object of monitoring 300 displays media contents of the selected channel on a screen.

Herein, it is judged the media contents extraction time set as the reference data by the control of the microcomputer 410 is the same with the media contents providing time of the present digital television receiver, the extraction cycle setting unit 420 outputs a media contents sample extraction request signal to the media contents sample extracting unit 430.

By the media contents sample extraction request signal transmitted from the extraction cycle setting unit 420, the media contents sample extracting unit 430 extracts a media contents sample displayed on the digital television receiver, namely, one screen information periodically according to the preset cycle and outputs it to the sample data converting unit 440.

Herein, it is judged the media contents extraction time expires according to the preset extraction cycle and time, the extraction cycle setting unit 420 outputs a media contents sample extraction end signal to the media contents sample extracting unit 430 according to the control of the microcomputer 410.

Herein, the media contents sample extracted by the media contents sample extracting unit 430 is one screen information displayed on a screen of the digital television receiver or data extracted from one frame data as a bit map format, it can be varied according to a setting method.

The media contents sample extracting unit 430 ends the media contents sample extraction operation according to the media contents sample extraction end signal transmitted from the extraction cycle setting unit 420.

The sample data converting unit 440 converts the extracted media contents sample into a graphic image file format appropriate to a web protocol as a data conversion format set by the control of the microcomputer 410 and outputs it to the media contents sample providing unit 450. Herein, the graphic image file format appropriate to the web protocol is a JPEG file format or a GIF file format.

Herein, generally the extracted media contents sample, namely, one screen information is information captured as a bitmap format.

In general, a bitmap displays each pixel as a space bit and a color bit. Not each pixel in every row requires information for displaying color, but information for displaying color is required only when color is changed while displaying each pixel along the rows, in the digital television receiver using the same color for a certain image many times. Screen information can be captured by using the bitmap.

In display of an image, the bitmap uses a raster graphic constructed with predetermined scanning lines, when the user changes a size of the image, because not only definition is lowered but also control thereof is not easy, it is not appropriate to a communication protocol using the Internet, and accordingly it is preferable to convert the media contents sample capturing one image into a JPEG or GIF file format as a graphic file format appropriate to the web protocol.

The media contents sample providing unit 450 transmits the data-converted media contents sample to the Internet terminal 320 as a computer of the guardian according to the transmission cycle for the media contents sample set as the reference data by the control of the microcomputer 410.

Herein, the media contents sample providing unit 450 transmits the media contents sample to the Internet terminal 320 in a remote place through an Internet service of a communication company by the web server program or the file server program.

Herein, transmitting of the media contents sample to the Internet terminal 320 is performed not by a search operation of the Internet terminal 320 but by a push technique for transmitting automatically the media contents sample to the Internet terminal 320 with the web server program or the file server program.

In the meantime, the data format converting unit 460 converts the media contents sample data-converted by the sample data converting unit 440 into a data format to be stored according to the control of the microcomputer 410.

Figure 5:
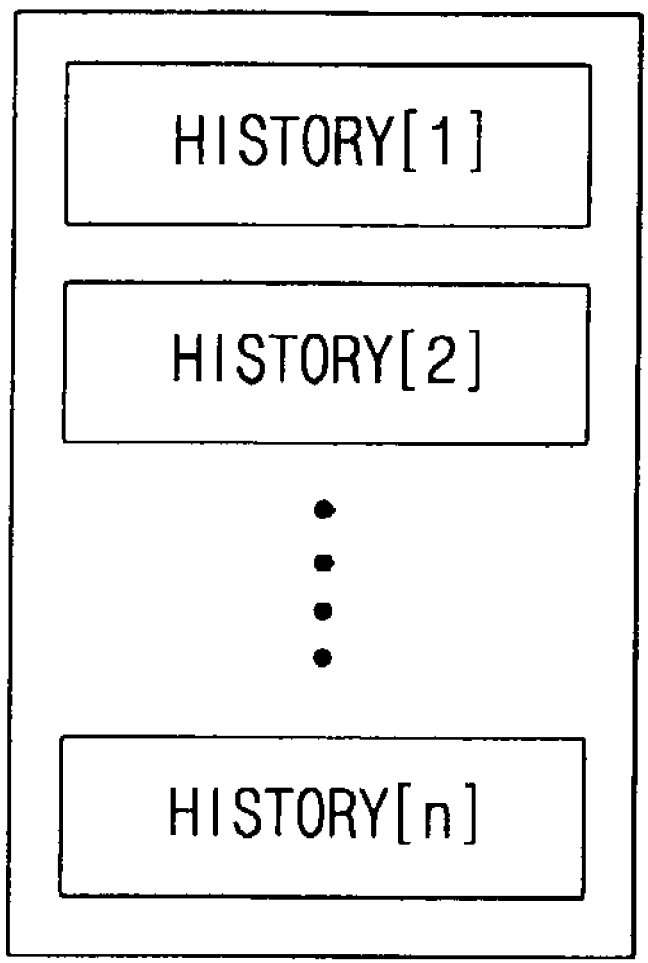
FIG. 5 illustrates a media contents sample stored as a history arrangement structure.

In more detail, as depicted in FIG. 5, in order to construct the media contents sample as several history arrangements according to the predetermined data arrangement conditions such as a position, an interval and a row, the data format converting unit 460 performs data-format of the media contents sample and outputs it to the storing unit 470.

The storing unit 470 stores the media contents sample transmitted from the data format converting unit 460. Herein, the media contents sample stored in the storing unit 470 is outputted to the media contents sample providing unit 450 by the control of microcomputer 410 or is displayed on the screen of the object of monitoring 300 by a request of the monitor.

Herein, the storing unit 470 can be constructed as a non-volatile memory built in the digital television receiver or an additional storage.

The media contents sample providing unit 450 transmits the media contents sample transmitted from the storing unit 470 to the Internet terminal 320 contacted to the Internet according to the control signal of the microcomputer 410.

The Internet terminal as the computer of the guardian downloads the media contents information received through the Internet, when an extraction request signal is inputted by the operation of the guardian, the Internet terminal 320 displays the downloaded media contents sample on the screen.

By the media contents sample displayed on the screen, the guardian can check the media contents displayed on the screen of the digital television receiver (the object of monitoring 300) and monitor whether the minor watches NC-17 rated media contents through the displayed media content information.

A media contents remote monitoring method of the media contents monitoring system will be described in detail with reference to accompanying drawings.

Figure 6:
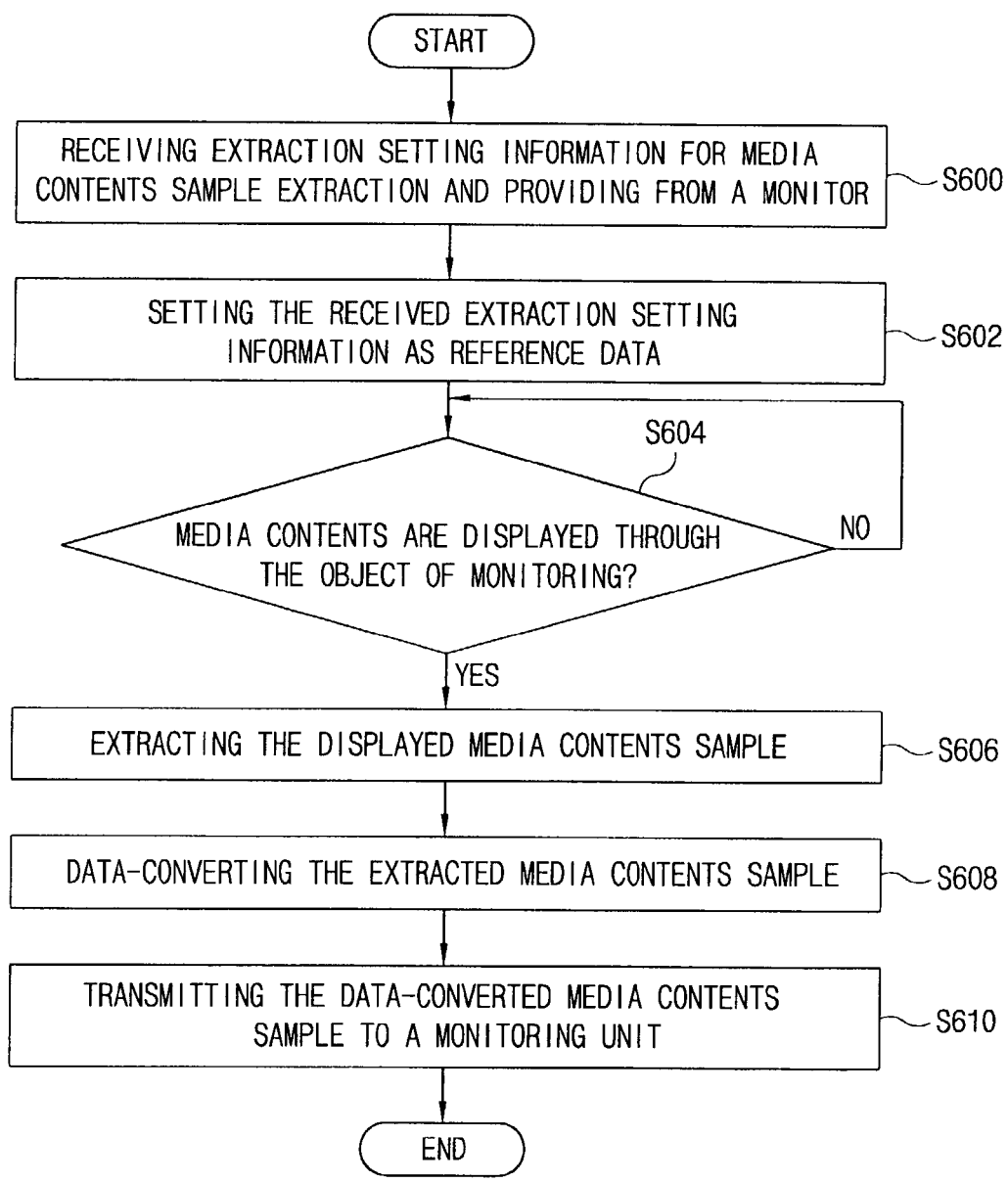
FIG. 6 is a flow chart illustrating a media contents monitoring method in accordance with the present invention.

FIG. 6 is a flow chart illustrating the media contents remote monitoring method in accordance with the present invention.

First, the guardian inputs extraction setting information for extracting and providing a media contents sample to the media contents monitoring apparatus 310 through the extraction information inputting unit 400 as shown at step S600.

Herein, the extraction setting information includes a sample extraction key signal, sample extraction cycle and time, data conversion information of the extracted media contents sample, the data-converted media contents sample providing cycle and time information.

In the step S600, before the user inputs the extraction setting information, a password request process for confirming a user identification and an identification confirming process for checking a password inputted by the user are performed.

By the control of the microcomputer 410, the media contents sample extracting unit 430, the sample data converting unit 440 and the media contents sample providing unit 450 set the extraction setting information transmitted through the extraction information inputting unit 400 as reference data as shown at step S602.

Afterward, the microcomputer 410 monitors whether media contents are displayed through the object of monitoring 300, namely, the digital television receiver by a request of the minor as the target of monitoring as shown at step S604.

In the step S604, when the media contents are displayed through the digital television receiver, by the control of the microcomputer 410, the media contents sample extracting unit 430 extracts a displayed media contents sample according to the extraction cycle and time set as the reference data as shown at step S606.

Herein, the media contents sample extracted by the media contents sample extracting unit 430 is one screen information displayed on the screen of the digital television receiver or one frame information constructing screen information.

Then, the sample data converting unit 440 converts the media contents sample extracted by the media contents sample extracting unit 430 into a JPEG file format or a GIF file format as a graphic image file format appropriate to the web protocol as shown at step S608.

The media contents sample providing unit 450 transmits the media contents sample data-converted by the sample data converting unit 440 to the Internet terminal 320 in the Internet connection state by the pre-stored web server program or the file server program as shown at step S610.

In addition, the media contents sample providing unit 450 can transmit the media contents sample data-converted into the several history arrangements structure by the data format converting unit 460 and temporarily stored in the storing unit 470 to the Internet terminal 320 in the Internet connection state according to the control of the microcomputer 410.

The Internet terminal 320 connected to the media contents monitoring apparatus 310 through the Internet, namely, the guardian's computer downloads the received media contents sample and displays it on the screen of the Internet terminal 320 by a request of the guardian.

The guardian can check media contents in which the minor as the target of monitoring watches at present or watches at a certain time through the media contents sample displayed on the screen of the Internet terminal 320.

As described above, in the present invention, by extracting a media contents sample from media contents displayed through the object of monitoring such as a digital television receiver by using preset extraction setting information and transmitting it to a monitoring apparatus in a remote place through the Internet, a monitor can check the media contents displayed on the object of monitoring through the received media contents sample in a remote place.

Accordingly, in the present invention, even in a remote place, the monitor as the guardian can monitor media contents in which a minor as the target of monitoring watches through the object of monitoring, it is possible to protect the minor from inappropriate media contents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A media contents monitoring apparatus, comprising:
an extraction information inputting unit configured to receive from a user extraction setting information for extracting a sample from media contents displayed on a screen of a device being monitored;
a media contents sample extracting unit configured to extract the sample from the media contents displayed on the screen of the monitored device based on the extraction setting information to form an extracted media contents sample;
a sample data converting unit configured to convert the extracted media contents sample into a new data format based on the extraction setting information to form a converted extracted media contents sample; and
a media contents sample providing unit configured to transmit the converted extracted media contents sample through a network to a monitoring device based on the extraction setting information,
wherein the user provided extraction setting information includes
a user provided sample extraction cycle,
a user provided sample extraction time,
user provided data conversion information for converting the extracted media contents sample,
a user provided transmission cycle for transmitting the converted extracted media contents sample, and
a user provided transmission time for transmitting the converted extracted media contents sample.

2. The apparatus of claim 1, further comprising:
a data format unit configured to format and store the converted sampled media contents sample as a history arrangement structure.

3. The apparatus of claim 2, wherein
the data formatting unit is configured to output the history arrangement structure via the media contents sample providing unit to the monitoring device through the network only when an extract request is received, and
the sample data converting unit is configured to automatically output the converted extracted media contents sample via the media contents sample providing unit to the monitoring device through the network.

4. The apparatus of claim 1, wherein the network is the Internet.

5. The apparatus of claim 4, wherein the monitoring device remotely located from the monitored device is configured to display the media contents sample received through the network.

6. The apparatus of claim 1, wherein the extracted media contents sample is screen information capturing one screen displayed on the monitored device or one frame information constructing the screen information.

7. The apparatus of claim 1, wherein the apparatus is built in the monitored device or is constructed as an outer packaging.

8. The apparatus of claim 1, wherein the new data format is a JPEG format or a GIF format.

9. The apparatus of claim 1, wherein the extraction information inputting unit is configured to confirm the user's identification by checking a password before inputting the extraction setting information.

10. A media contents monitoring method, comprising the steps of:
receiving from a user extraction setting information for extracting a sample from media contents displayed on a screen of a device being monitored;
extracting the sample from the media contents displayed on the screen of the monitored device based on the extraction setting information to form an extracted media contents sample;
converting the extracted media contents sample into a new data format based on the extraction setting information to form a converted extracted media contents sample; and
transmitting the converted extracted media contents sample through a network to a monitoring device based on the extraction setting information,
wherein the user provided extraction setting information includes
a user provided sample extraction cycle, a user provided sample extraction time, user provided data conversion information for converting the extracted media contents sample, a user provided transmission cycle for transmitting the converted extracted media contents sample, and a user provided transmission time for transmitting the converted extracted media contents sample.

11. The method of claim 10, further comprising:

formatting and storing the converted sampled media contents sample as a history arrangement structure.

12. The method of claim 11, further comprising one of:

outputting the history arrangement structure to the monitoring device through the network only when an extract request is received, and automatically outputting the converted extracted media contents sample to the monitoring device through the network.

13. The method of claim 10, wherein the extracted media contents sample is screen information capturing one screen displayed on the monitored device or one frame information constructing the screen information.

14. The method of claim 10, wherein the new data format is a JPEG format or a GIF format.

15. The method of claim 10, the step of receiving from a user extraction setting information comprising:

confirming the user's identification by checking a password.

16. The method of claim 10, wherein the network is the Internet.

17. The method of claim 10, further comprising:

displaying the media contents sample on the monitoring device.

* * * * *